(12) United States Patent
Feld

(10) Patent No.: US 6,499,919 B2
(45) Date of Patent: Dec. 31, 2002

(54) CYLINDRICAL BIT WITH HARD METAL CUTTING EDGES

(75) Inventor: Harald Feld, Oberndorf (DE)

(73) Assignee: Tigra Harlstoff GmbH, Oberndorf (DE)

( * ) Notice: Subject to any disclaimer, the term of this patent is extended or adjusted under 35 U.S.C. 154(b) by 25 days.

(21) Appl. No.: 09/817,791

(22) Filed: Mar. 27, 2001

(65) Prior Publication Data

US 2002/0141837 A1 Oct. 3, 2002

(51) Int. Cl.⁷ ................................................. B23B 51/02
(52) U.S. Cl. ........................ 408/213; 408/227; 408/231; 408/713
(58) Field of Search .................... 408/144, 213, 408/214, 223, 224, 225, 231, 233, 713, 226, 227

(56) References Cited

U.S. PATENT DOCUMENTS 1,515,548 A * 11/1924 Cerotsky ..................... 408/233
4,090,807 A *  5/1978 Stewart ....................... 408/214
5,980,166 A * 11/1999 Ogura ......................... 408/144

FOREIGN PATENT DOCUMENTS

DE        2733301 A1 *  2/1979   ................. 408/225
DE        3719758 A1 *  1/1989   ................. 408/213

* cited by examiner

*Primary Examiner*—Daniel W. Howell
(74) *Attorney, Agent, or Firm*—Klaus J. Bach

(57) ABSTRACT

In a cylindrical drill bit comprising a tool body with a head having a front face and a cylindrical shaft for chucking the tool body, a hard metal cutting plate structure is mounted on the front face of the head and includes cutting edges formed integrally with the hard metal cutting plate.

10 Claims, 1 Drawing Sheet

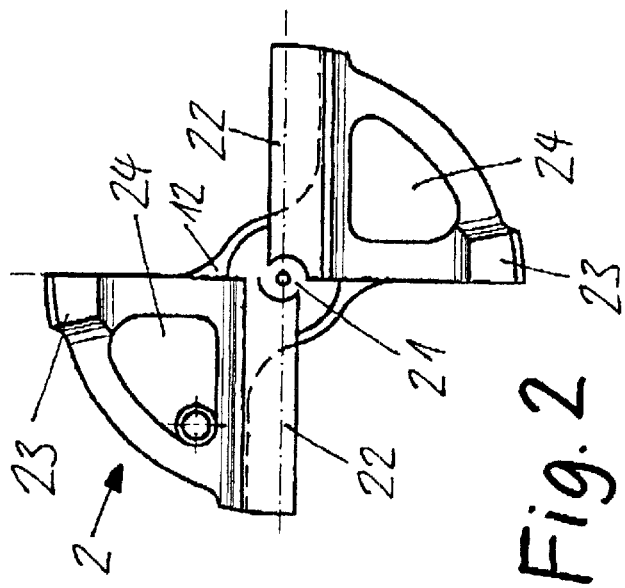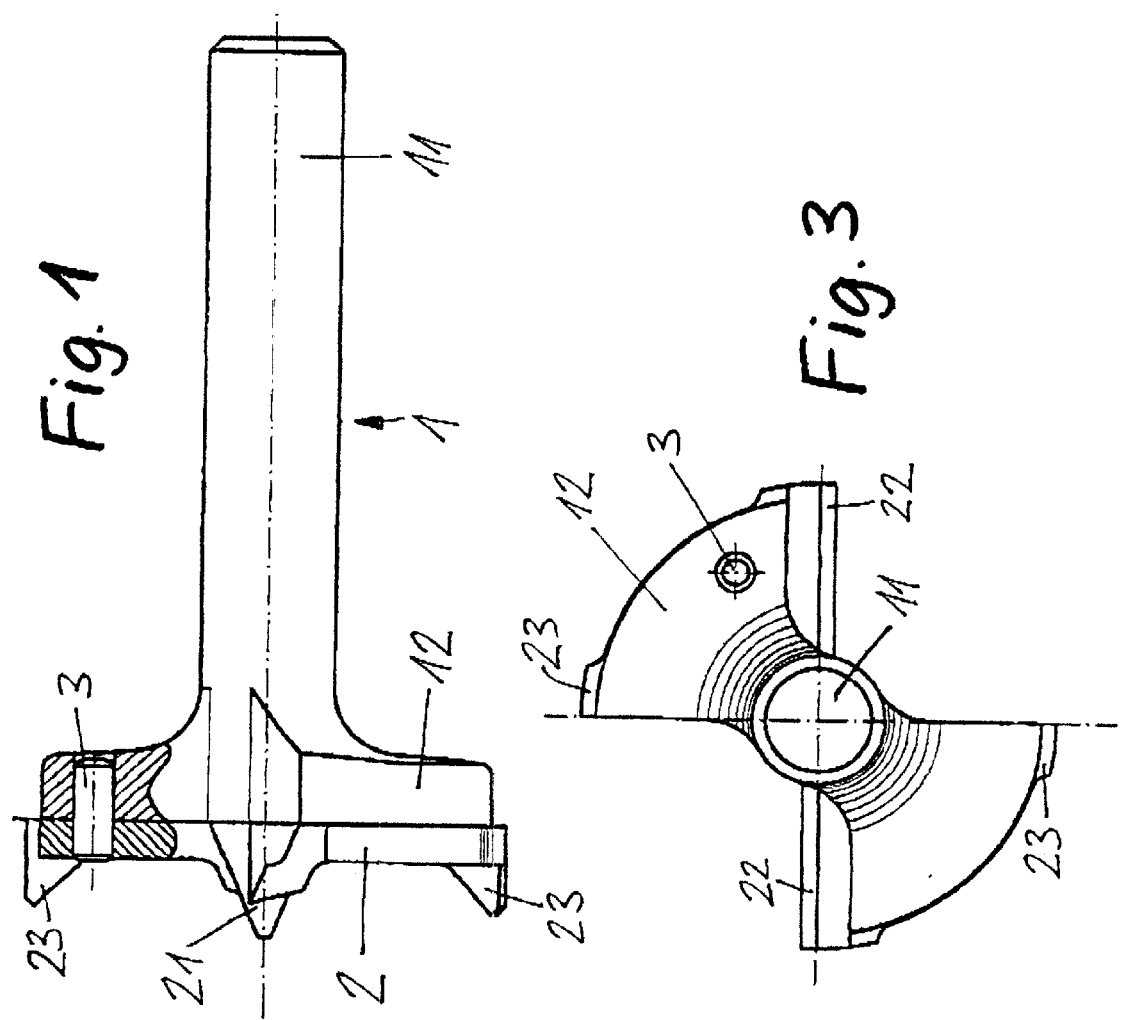

CYLINDRICAL BIT WITH HARD METAL CUTTING EDGES

BACKGROUND OF THE INVENTION

The invention relates to a drill bit, and more specifically, to a cylindrical bit with hard metal cutting edges. Such a cylindrical bit is a drilling tool which has a disc-like, that is a cylindrical, head provided at its front side and, possibly at its circumference, with a number of cutting edges.

Such drill bits consist usually of a tool body of tool steel which includes a head into which cutting edges of hard metal are inserted or onto which the cutting edges are soldered or welded. The manufacturing process for such drill bits with individually manufactured and installed cutting edges however is time-consuming and expensive.

The alternative possibility to make the tool completely from hard metal is not desirable either since such hard metal is very expensive, whereby the tool would become even more expensive.

It is therefore the object of the present invention to provide an improved design of a cylindrical bit, which is easier and less expensive to manufacture.

SUMMARY OF THE INVENTION

In a cylindrical drill bit comprising a tool body with a head having a front face and a cylindrical shaft for chucking the tool body, a hard metal cutting plate structure is mounted on the front face of the head and includes cutting edges formed integrally with the hard metal cutting plate.

The drill bit according to the invention consists accordingly of a body of a tool steel with a head formed by a simple disc having a flat front face. On the front surface, a cutting plate is disposed which consists completely of hard metal and which is attached to the front face by soldering or cementing. This hard metal plate is in the form of a spoke wheel that is it does not have the form of a flat disc, but it is provided with openings whereby a substantial amount of hard metal is saved. The cutting plate may be manufactured by injection molding from a hard metal powder which is mixed with a medium that makes it flowable so that it can be molded by injection molding, as is known per se. The cutting plate is therefore molded in essentially its final shape that is with cutting edge structures which later only need to be ground to form the cutting edges.

The front surface of the tool body may be provided with fitting pins, which in co-operation with the openings in the cutting plate provide for a centering of the cutting plate on the tool body head when placed thereon.

An embodiment of the invention will be described in greater detail below on the basis of the accompanying drawings.

BRIEF DESCRIPTION OF THE DRAWINGS

FIG. 1 is a partially sectional side view of a drill bit according to the invention, FIG. 2 is a front view of the drill bit shown in FIG. 1, and FIG. 3 is an axial view of the drill bit as seen from the shaft end thereof.

DESCRIPTION OF A PREFERRED EMBODIMENT

The cutting tool (drill bit) according to the invention comprises a tool body 1 with a shaft 4 and a head 12 and a cutting plate 2 of hard metal disposed on the head 12. The tool body 1 consists of tool steel.

The shaft 11 of the tool body 1, which is needed for chucking the tool is, as usual, cylindrical. The head 12 of the tool body is essentially in the form of a plate, which has two diametrically opposite cut-outs which serve as chambers for receiving shavings. The plate therefore consists essentially of two diametrically opposite segments. At its rear side, the head 12 includes a transition structure to the shaft 11. The front surface of the head 12 is plane and serves as a support surface for the cutting plate 2.

As apparent from the front view of FIG. 2, the head 12 has a shape corresponding to the cutting plate 2 that is it comprises diametrically oppositely arranged quarter circle segments which are joined by a center section. As apparent from FIGS. 1 and 2, the cutting plate is provided in the shown embodiment with a central drill tip 21, two cutting edges 22 which extend radially from the drill tip 21 in opposite directions and two diametrically opposite pre-cutter 23, which are circumferentially displaced from the cutting edges 22 by about 90°.

In order to save hard metal material, the cutting plate 2 further has cut-out portions 24 so that the cutting plate body has, in an axial view, about the shape of an 8.

As shown the cutout portions 24 are delimited by an arced outer web and two radial spoke-like webs by which the outer arc-like webs are connected to the center area of the cutting plate 2. It is noted that another arc-like web may extend through the cutout portions 24 for interconnecting the center areas of the adjacent spoke-like webs.

Each of the two main cutting edges 22 is disposed on the radial web which, in the direction of rotation of the cutting plate, is the front web and each pre-cutter 23 is disposed, in the direction of rotation, adjacent the rear radial web of the respective cutting plate segment.

It is pointed out that it is of course not necessary to provide two cutting edges as shown in the drawings, but that a three- or four wing structure may be used, wherein the head 12 of the tool body and the cutting blade each include three or four segments.

The cutting plate 2 is attached to the front surface of the head 12 of the tool body by soldering or cementing.

As best shown in FIG. 1, the head 12 of the tool body 1 includes a bore, in which a fitting pin 3 is disposed. The fitting pin 3 extends into one of the openings 24 of the cutting plate 2 for centering the cutting plate 2 on the tool head front surface. Of course, it is possible to use more than one fitting pin 3, for example, two opposite fitting pins which are disposed adjacent the diametrically opposite walls of a segments of the toolhead 12.

What is claimed is:

1. A cylindrical drill bit comprising a tool body with a quasi-cylindrical head having a front face and a cylindrical shaft extending axially from said head for chucking said tool body, and a hard metal cutting plate structure disposed on the front face of said head and including hard metal cutting edges integrally formed with said hard metal plate structure, said hard metal cutting plate structure including a number of equal circle segment-like plate sections which are arranged at equal angular distances around a center portion of said hard metal cutting plate structure, and each of said segment-like plate sections having a circumferentially extending outer web and two radial webs extending between the circumferential ends of said outer web and said center portion in a spoke-like manner, with an opening disposed between the circumferentially extending outer web and the two radial webs.

2. A drill bit according to claim 1, wherein said hard metal cutting plate structure includes a central drill tip, at least two web-like radially extending main cutting edges and at least two pre-cutting edges arranged, opposite one another, at circumferential edges of said hard metal cutting plate structure and projecting axially therefrom.

3. A drill bit according to claim 1, wherein said hard metal cutting plate structure is attached to said tool body head face by soldering.

4. A drill bit according to claim 1, wherein said head of said tool body is adapted in shape to said hard metal cutting plate structure and is provided with a number of openings corresponding in size, shape, and arrangement to those provided in said hard metal cutting plate structure.

5. A drill bit according to claim 1, wherein a main cutting edge is formed on the radial web of each circle segment-like cutting plate section which, in the direction of rotation of said drill bit during operation, is the front edge of said plate section.

6. A drill bit according to claim 5, wherein each circle segment-like cutting plate section includes a pre-cutting edge formed at its circumferential edge adjacent the radial web opposite the front edge of said plate section.

7. A drill bit according to claim 1, wherein said hard metal cutting plate structure is attached to said tool body head face by cementing.

8. A drill bit according to claim 1, wherein said tool body head includes at least one fitting pin which projects from the front face thereof and which extends into an opening formed in one of said segment-like plate sections.

9. A drill bit according to claim 8, wherein said fitting pin is so arranged on said tool body head front face that it extends into a corner area of said opening formed between said circumferential web and a radial web so as to form a radial and a circumferential stop for said hard metal cutting plate structure.

10. A drill bit according to claim 1, wherein said hard metal cutting plate structure comprises two segment-like plate sections, which are disposed diametrically opposite each other.

* * * * *